(12) United States Patent
Bitton

(10) Patent No.: US 11,946,117 B2
(45) Date of Patent: *Apr. 2, 2024

(54) PRODUCT COMPRISING RECYCLED ALUMINUM ALLOY WHEEL FRAGMENTS AND AN ALLOYING SUPPLEMENT, AND METHODS AND SYSTEM FOR PRODUCING SAME

(71) Applicant: House of Metals Company Limited, Toronto (CA)

(72) Inventor: Daniel Bitton, Toronto (CA)

(73) Assignee: HOUSE OF METALS COMPANY LIMITED, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,628

(22) Filed: May 10, 2022

(65) Prior Publication Data

US 2022/0275478 A1    Sep. 1, 2022

Related U.S. Application Data

(63) Continuation of application No. 16/943,428, filed on Jul. 30, 2020, now Pat. No. 11,359,262.

(60) Provisional application No. 62/946,119, filed on Dec. 10, 2019, provisional application No. 62/883,742, filed on Aug. 7, 2019.

(51) Int. Cl.
| | |
|---|---|
| *C22C 1/02* | (2006.01) |
| *B22D 11/08* | (2006.01) |
| *B22D 11/108* | (2006.01) |
| *B22D 11/16* | (2006.01) |
| *B22D 21/04* | (2006.01) |
| *B22D 46/00* | (2006.01) |
| *C22B 21/00* | (2006.01) |
| *C22C 21/00* | (2006.01) |

(52) U.S. Cl.
CPC .............. *C22C 1/026* (2013.01); *B22D 11/08* (2013.01); *B22D 11/108* (2013.01); *B22D 11/16* (2013.01); *B22D 21/04* (2013.01); *B22D 46/00* (2013.01); *C22B 21/0069* (2013.01); *C22C 21/00* (2013.01)

(58) Field of Classification Search
CPC ....... B22D 11/08; B22D 11/108; B22D 11/16; B22D 21/04; B22D 46/00; C22B 21/0069; C22C 1/026; C22C 21/00; Y02P 10/20
See application file for complete search history.

(56) References Cited

U.S. PATENT DOCUMENTS

| | | | |
|---|---|---|---|
| 6,983,901 | B2 | 1/2006 | Bitton et al. |
| 7,086,618 | B2 | 8/2006 | Bitton et al. |
| 10,845,279 | B1 | 11/2020 | Bitton |
| 2005/0051647 | A1 | 3/2005 | Bitton et al. |
| 2017/0173636 | A1 | 6/2017 | Bitton |
| 2021/0010103 | A1 | 1/2021 | Bitton |

FOREIGN PATENT DOCUMENTS

| | | |
|---|---|---|
| CN | 102566526 A | 7/2012 |
| CN | 103173622 A | 6/2013 |
| WO | 2018125199 A1 | 7/2018 |

OTHER PUBLICATIONS

Search Report and Written Opinion dated Oct. 22, 2020 in respect of PCT/CA2020/051052.
Office Action dated Dec. 3, 2021 in respect of U.S. Appl. No. 16/943,428.
Office Action dated Jul. 15, 2021 in respect of U.S. Appl. No. 16/943,428.
Supplementary European Search Report dated Jul. 21, 2023 in respect of European Application No. 20850125.4.
The Aluminum Association, "Rolling Aluminum: From the Mine Through the Mill", The Aluminum Association Manual, Dec. 1, 2007.

*Primary Examiner* — Jenny R Wu
(74) *Attorney, Agent, or Firm* — Bereskin & Parr LLP/S.E.N.C.R.L., s.r.l.

(57) ABSTRACT

A product comprising recycled metal fragments and an alloying supplement, and methods and system for producing same. In some examples, the product comprises a container, shot blasted pieces of aluminum alloy wheels and an alloying supplement. In some examples, the product also comprises an indication on the container of a composition estimate of the combined shot blasted pieces and alloying supplement. In other examples, the indication and/or the alloying supplement may be provided by a company in the business of providing alloying supplements.

8 Claims, 6 Drawing Sheets

PRODUCT COMPRISING RECYCLED ALUMINUM ALLOY WHEEL FRAGMENTS AND AN ALLOYING SUPPLEMENT, AND METHODS AND SYSTEM FOR PRODUCING SAME

RELATED APPLICATIONS

This application is a continuation of application Ser. No. 16/943,428 filed Jul. 30, 2020, which claims priority to Application No. 62/946,119 filed Dec. 10, 2019 and Application No. 62/883,742 filed Aug. 7, 2019, the entire contents of each of which are incorporated herein by reference.

FIELD

The described embodiments relate to the field of recycling, in particular, the field of recycling waste metal and supplementing waste metal with alloys during the recycling process.

BACKGROUND

Recycling what would otherwise be waste materials to form new materials or objects is important in modern waste management. Many different materials can be recycled, for example, glass, paper, cardboard, metal, plastic, tires, textiles, batteries, and electronics. The typical method for recycling waste material includes pickup, sorting, cleaning, and processing.

Metals are of particular value for recycling. Unlike other materials, metals may be recycled into products of substantially similar quality to their feed material.

Slight differences in elemental composition can result in vastly different material properties. Certain high value alloys have very specific elemental compositions. Metals provided for recycling may have discrepancies in elemental composition from desired high value alloys.

SUMMARY

This summary is intended to introduce the reader to various aspects of the applicant's teaching, but not to define any specific embodiments. In general, disclosed herein are one or more methods of recycling waste metal.

In a first aspect, some embodiments of the invention provide a method of recycling aluminum alloy wheels. The method comprises: providing a feed of aluminum alloy wheels; fragmenting the aluminum alloy wheels into a plurality of fragments; subjecting the plurality of fragments to shot blasting to remove surface impurities from the plurality of fragments to produce a plurality of shot blasted pieces; determining an estimated mass of the plurality of shot blasted pieces; determining an aggregate composition estimate for the plurality of shot blasted pieces, the aggregate composition estimate comprising a plurality of element concentration estimates comprising an element concentration estimate for each element in a plurality of elements. Based at least partly on the aggregate composition estimate, a selected target alloy is selected, the selected target alloy having a plurality of element ranges comprising an element range for each element in the plurality of elements. A discrepancy estimate is determined by determining, for each element in the plurality of elements, a discrepancy between the element concentration estimate for that element and the element range of the selected target alloy for that element, wherein the discrepancy between the element concentration estimate for at least one element and the element range of the selected target alloy for that element is non-zero. Based on the discrepancy estimate and the estimated mass of the plurality of shot blasted pieces, an alloying supplement is determined, having a supplement mass and composition for including with the plurality of shot blasted pieces to change the aggregate composition estimate to an adjusted composition estimate wherein, for each element in the plurality of elements, the element concentration estimate of the adjusted composition estimate for that element is within the element range of the target alloy for that element. Providing, for use in manufacturing a component made from the selected target alloy, i) the alloying supplement, from a source other than the feed of aluminum alloy wheels, and ii) the plurality of the shot blasted pieces.

According to some aspects of some embodiments of the present invention, selecting the selected alloy and determining the discrepancy estimate comprises determining a comparison of the aggregate composition estimate to each target alloy in a plurality of target alloys including determining the discrepancy estimate for the selected target alloy. Each target alloy in the plurality of target alloys has a plurality of element ranges comprising an element range for each element in the plurality of elements. Selecting the selected target alloy is further based on the comparison.

According to some aspects of some embodiments of the present invention, determining the comparison comprises, for each target alloy in the plurality of target alloys, determining an alloy-specific discrepancy estimate for that target alloy. The alloy-specific discrepancy estimate for that target alloy comprises, for each element in the plurality of elements, a discrepancy between the element concentration estimate for that element and the element range of that target alloy for that element. For each target alloy in the plurality of target alloys, the discrepancy between the element concentration estimate for at least one element and the element range of that target alloy for that element is non-zero. The discrepancy estimate is the alloy-specific discrepancy estimate for the selected target alloy.

According to some aspects of some embodiments of the present invention, the method further comprises maintaining the source of the alloying supplement, by, for each element of at least some elements in the plurality of elements, maintaining dispensable quantities of that element such that mass quantities of that element are dispensable with a precision within plus or minus one percent of the mass dispensed.

According to some aspects of some embodiments of the present invention, at least some elements in the plurality of elements comprises at least one of silicon, iron, magnesium, manganese, titanium, strontium, zinc, copper, chromium, nickel and tin.

According to some aspects of some embodiments of the present invention, the method further comprises providing a minimum dispensing increment of at least one of silicon, iron, magnesium, manganese, titanium, strontium, zinc, copper, chromium, nickel and tin; and, jointly controlling the minimum dispensing increment and the estimated mass of the plurality of shot blasted pieces such that the minimum dispensing increment is smaller than an amount necessary to increase the composition of the element being dispensed from a minimum composition value of the element being dispensed for the target alloy to a maximum composition value of the element being dispensed for the target alloy for the given estimated mass of the plurality of shot blasted pieces.

According to some aspects of some embodiments of the present invention, maintaining the source of the alloying supplement comprises maintaining a supply of aluminum for including in the alloying supplement.

According to some aspects of some embodiments of the present invention, an indication of the adjusted composition estimate or the selected target alloy is provided with the alloying supplement and the plurality of the shot blasted pieces.

According to some aspects of some embodiments of the present invention, providing i) the alloying supplement, ii) the plurality of the shot blasted pieces, and iii) the indication of the adjusted composition estimate for the selected target alloy, comprises sealing the alloying supplement and the shot blasted pieces in a container for shipping and to impede contamination during shipping, and providing the indication of the adjusted composition estimate and/or the selected target alloy on the container.

According to some aspects of some embodiments of the present invention, the method further comprises storing, for each target alloy in the plurality of target alloys, the plurality of element ranges for that target alloy in a non-transient electronically readable memory in electronic communication with the computer processor. Determining the aggregate composition estimate for the plurality of shot blasted pieces comprises operating a computer processor to determine the aggregate composition estimate from the plurality of composition measurements of the material of the plurality of shot blasted pieces. Determining the comparison of the aggregate composition estimate to each target alloy in the plurality of target alloys comprises operating the computer processor to determine the comparison based on the aggregate composition estimate and the plurality of element ranges for that target alloy obtained from the non-transient electronically readable memory. Determining the discrepancy estimate comprises operating the computer processor to determine the discrepancy estimate based on the comparison and for each element in the plurality of elements, a discrepancy between the element concentration estimate for that element and the element range of the selected target alloy for that element. Determining the alloying supplement having the supplement mass and composition comprises operating the computer processor to determine the supplement mass and composition.

According to some aspects of some embodiments of the present invention, the method further comprises operating the non-transient electronically readable memory to store: i) value information including, for each target alloy in a plurality of target alloys, a value per unit mass of that target alloy; and ii) cost information including, for at least some elements in the plurality of elements, a cost per unit mass of that element included in the alloying substance. Selecting the selected target alloy from the plurality of target alloys comprises operating the computer processor to select the selected target alloy based at least partly on the discrepancy estimate, and the value information and cost information received from the non-transient electronically readable memory.

According to some aspects of some embodiments of the present invention, determining the aggregate composition estimate for the plurality of shot blasted pieces comprises determining a plurality of composition measurements of the material of the plurality of shot blasted pieces.

According to some embodiments of the present invention, there is provided a system for providing an aluminum alloy product. The system comprises: an aluminum alloy wheel transfer mechanism for providing a feed of a plurality of aluminum alloy wheels; an aluminum alloy wheel processor for fragmenting the plurality of aluminum alloy wheels into a plurality of fragments, and then cleaning the plurality of fragments to provide a plurality of cleaned fragments; a non-transient electronically readable memory for storing, for each target alloy in a plurality of target alloys, a plurality of element ranges comprising an element range for each element in the plurality of elements; a composition analyzer for measuring a composition of at least some of the plurality of cleaned fragments to determine a plurality of composition measurements; a weigh scale for determining a mass of the plurality of cleaned fragments; and, a computer processor in electronic communication with the non-transient electronically readable memory, the weigh scale, and the composition analyzer. In operation, the computer processor receives the plurality of composition measurements from the composition analyzer and determines an aggregate composition estimate for the plurality of cleaned fragments, the aggregate composition estimate comprising a plurality of element concentration estimates comprising an element concentration estimate for each element in the plurality of elements. Based at least partly on the aggregate composition estimate, a selected target alloy is selectable by the computer processor, the selected target alloy having a plurality of element ranges comprising an element range for each element in the plurality of elements. In operation, the computer processor determines a discrepancy estimate, by determining, for each element in the plurality of elements, a discrepancy between the element concentration estimate for that element and the element range of the selected target alloy for that element, wherein the discrepancy between the element concentration estimate for at least one element and the element range of the selected target alloy for that element is non-zero. Based on the discrepancy estimate and the estimated mass of the plurality of shot blasted pieces, the computer processor in operation determines an alloying supplement having a supplement mass and composition for including with the plurality of shot blasted pieces to change the aggregate composition estimate to an adjusted composition estimate wherein, for each element in the plurality of elements, the element concentration estimate of the adjusted composition estimate for that element is within the element range of the target alloy for that element.

In some variants of the system for providing an aluminum alloy product, the computer processor, in operation, further determines a comparison of the aggregate composition estimate to each target alloy in a plurality of target alloys, each target alloy in the plurality of target alloys having a plurality of element ranges comprising an element range for each element in the plurality of elements, wherein selecting the selected target alloy is further based on the comparison.

In some variants of the system for providing an aluminum alloy product, determining the comparison comprises, for each target alloy in the plurality of target alloys, determining an alloy-specific discrepancy estimate for that target alloy comprising, for each element in the plurality of elements, a discrepancy between the element concentration estimate for that element and the element range of that target alloy for that element, wherein the discrepancy between the element concentration estimate for at least one element and the element range of that target alloy for that element is non-zero, and the discrepancy estimate is the alloy-specific discrepancy estimate for the selected target alloy.

In some variants of the system for providing an aluminum alloy product, the non-transient electronically readable memory stores value information including, for each target alloy in a plurality of target alloys, a value per unit mass of that target alloy; and cost information including, for at least some elements in the plurality of elements, a cost per unit mass of that element included in the alloying substance. In operation, the computer processor selects the selected target alloy based at least partly on the discrepancy estimate, and the value information and cost information received from the non-transient electronically readable memory.

In some variants of the system for providing an aluminum alloy product, the system further comprises a user interface for communicating the selected target alloy and the supplement mass and composition of the alloying supplement to a user/operator, the user interface being in electronic communication with the computer processor.

According to some aspects of some embodiments of the present invention, a product is provided. The product comprises a sealed container for impeding contamination of an interior of the container from outside the container; a plurality of shot blasted pieces of aluminum alloy wheels within the interior of the container; and an alloying supplement within the interior of the container, the alloying supplement excluding any pieces of aluminum alloy wheels.

According to some aspects of some embodiments of the present invention, a mass of the alloying supplement is less than 5% of a mass of the plurality of shot blasted pieces of aluminum wheels.

According to some aspects of some embodiments of the present invention, a mass of the alloying supplement is less than 1% of a mass of the plurality of shot blasted pieces of aluminum wheels.

According to some aspects of some embodiments of the present invention, at least 50% of the mass of the alloying supplement is composed of silicon, iron, magnesium, manganese, titanium and/or strontium.

According to some aspects of some embodiments of the present invention, at least 80% of the mass of the alloying supplement is composed of silicon, iron, magnesium, manganese, titanium and/or strontium.

According to some aspects of some embodiments of the present invention, the product includes an indication on the sealed container of a composition estimate of the combined shot blasted pieces and alloying supplement.

According to some aspects of some embodiments of the present invention, the alloying supplement comprises an alloying ingot wherein at least two elements in the plurality of elements are mixed and melted together.

According to some aspects of some embodiments of the present invention, there is a method of providing an alloying supplement. The method comprises: (1) receiving a mass measurement, the mass measurement being a measurement of a mass of a plurality of shot blasted pieces of aluminum alloy wheels; (2) receiving an aggregate composition estimate for the plurality of shot blasted pieces, the aggregate composition estimate comprising a plurality of element concentration estimates comprising an element concentration estimate for each element in a plurality of elements; (3) based at least partly on the aggregate composition estimate and a selected target alloy, the selected target alloy having a plurality of element ranges comprising an element range for each element in the plurality of elements, determining a discrepancy estimate by determining, for each element in the plurality of elements, a discrepancy between the element concentration estimate for that element and the element range of the selected target alloy for that element, wherein the discrepancy between the element concentration estimate for at least one element and the element range of the selected target alloy for that element is non-zero; (4) based on the discrepancy estimate and the estimated mass of the plurality of shot blasted pieces, determining an alloying supplement having a supplement mass and composition for including with the plurality of shot blasted pieces to change the aggregate composition estimate to an adjusted composition estimate wherein, for each element in the plurality of elements, the element concentration estimate of the adjusted composition estimate for that element is within the element range of the target alloy for that element; and, (5) providing the alloying supplement for use in combination with the plurality of the shot blasted pieces to manufacture a component made from the selected target alloy.

According to some aspects of some embodiments of the present invention, the alloying supplement is provided to a third-party foundry. In some embodiments, provided with the alloying supplement is an indication for associating the alloying supplement with the plurality of shot blasted pieces to be received at the third-party foundry from a source different from a source of the alloying supplement.

According to some aspects of some embodiments of the present invention, the method further comprises, based at least partly on the aggregate composition estimate, selecting a selected target alloy, the selected target alloy having a plurality of element ranges comprising an element range for each element in the plurality of elements.

According to some aspects of some embodiments of the present invention, selecting the selected alloy and determining the discrepancy estimate comprises determining a comparison of the aggregate composition estimate to each target alloy in a plurality of target alloys including determining the discrepancy estimate for the selected target alloy. Each target alloy in the plurality of target alloys has a plurality of element ranges comprising an element range for each element in the plurality of elements, and selecting the selected target alloy is further based on the comparison.

According to some aspects of some embodiments of the present invention, the alloying supplement comprises at least two of silicon, iron, magnesium, manganese, titanium, strontium, zinc, copper, chromium, nickel and tin.

According to some aspects of some embodiments of the present invention, providing the alloying supplement comprises melting and mixing quantities of at least two elements in the plurality of elements to provide at least one alloying ingot.

BRIEF DESCRIPTION OF THE DRAWINGS

These and other advantages of the instant invention will be more fully and completely understood in conjunction with the following detailed description of embodiments and aspects of the present invention with reference to the following drawings, in which.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Figure 1:
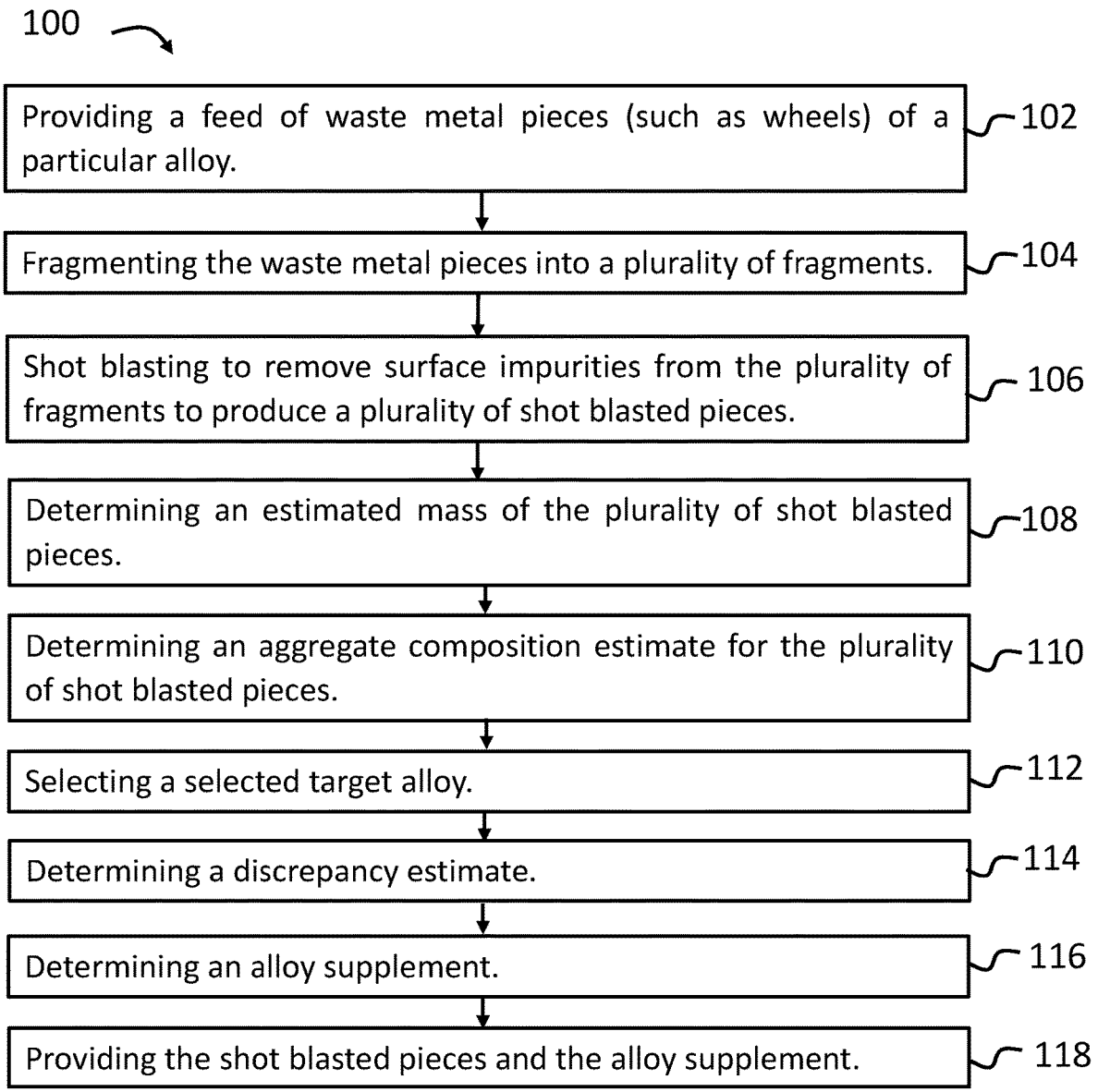
FIG. 1, in a flow chart, illustrates a method of recycling waste metal pieces.

Reference is first made to FIG. 1, in which a method 100 for recycling waste metal pieces is shown. Method 100 begins with providing a feed of waste metal pieces 102. The waste metal pieces provided at step 102 are of a particular alloy type. For example, the feed of waste metal pieces may be a feed of waste metal pieces composed of aluminum alloys. In other examples, the feed of waste metal pieces may be a feed of waste metal pieces composed of any one of bismuth alloys, brass alloys, cobalt alloys, copper alloys, gallium alloys, gold alloys, indium alloys, iron alloys, lead alloys, magnesium alloys, mercury alloys, nickel alloys, potassium alloys, silver alloys, steel alloys, tin alloys, titanium alloys, zinc alloys, zirconium alloys, etc.

In some examples of method 100, although each piece of waste metal in the feed may be made of the same alloy type, its composition may differ from the composition of at least one of the other pieces in the feed. In some examples, a piece may be one composition of two different compositions present in the feed. In other examples, a piece of waste metal may have one composition of any number of different compositions present in the feed of waste metal. The batch of waste metal pieces has an aggregate or batch composition based on the different compositions of the different pieces of waste metal, as well as the relative masses of those pieces of waste metal. For example, if all pieces of waste metal were to be melted down and mixed to provide a homogeneous aggregate or mixture, then this aggregate or batch composition would have the composition of that homogeneous mixture. This batch composition of the feed of waste metal pieces may be unknown when the pieces of waste metal are initially provided.

This feed of waste metal may all originate from the same kind of components being recycled. For example, a feed of aluminum alloy wheels of a particular alloy, such as aluminum alloy A356.2. Despite all the wheels being of a particular alloy type, they may nonetheless differ slightly in composition. Material properties may vary significantly with slight variations in composition. Alloys with certain specific elemental compositions may result in material properties that are much more desirable than alloys with slightly different elemental compositions. These material properties may include mechanical strength properties, chemical resistance properties, corrosion resistance and other properties. For example, certain specific elemental compositions may result in a measurably greater mechanical yield strength in tension.

At step 104, the waste metal pieces are fragmented into a plurality of fragments. In some examples, fragments may be produced by passing waste metal pieces through a fragmenting unit. A fragmenting unit may be a shredding apparatus. Any suitable shredder known in the art may be used. For example, waste metal pieces may be supplied to a hopper of a conventional shredding apparatus, such as the SSI Series 45H shredder available from SSI Shredding Systems Inc. at 9760 SW Freeman Drive, Wilsonville, Oreg., 97070-9286, USA. This shredding apparatus may include a cutter box housing cutters, which can be mounted on parallel shafts that rotate horizontally in opposite directions. The feed hopper can be located above the cutter box. Due to the force of gravity, the rims placed in the feed hopper can then be fed downwardly into the proper location where they can be engaged by the cutters and torn or cut into shreds.

At step 106, fragments are subjected to shot blasting. Waste metal pieces provided at step 102 may be coated in a number of coatings, such as paints, metal electroplating, ceramic coatings or plastic coatings. Similarly, external surfaces of waste metal pieces may be characterized by corrosion or environmental contamination. After fragmenting process 104, surfaces of fragments that were previously external surfaces of waste metal pieces may still be coated with a coating, corroded or otherwise contaminated. Newly exposed surfaces created by fragmenting process 104 may be substantially free of coatings.

When waste metal pieces or fragments created from the waste metal pieces are provided for recycling, the recycling process may include melting pieces into a bulk or aggregate batch. The composition of the aggregate batch may include elements present in any coatings or surface contamination present on the external surfaces of provided waste metal pieces, skewing the aggregate batch composition away from the composition of base alloys provided. This is undesirable, as material properties are sensitive to elemental composition. It is desirable to remove external surface coatings, corrosion and surface contamination, leaving behind a bare metal surface, free of contamination, coatings or corrosion.

During the shot blasting process 106, abrasive particles can be projected at the fragments at high speed. Abrasives impact the surfaces of the fragments. These impacts can dislodge coatings, corrosion, contamination and debris deposited on the surface of the fragments, resulting in fragments with bare metal surfaces largely free from coatings, corrosion, environmental contamination and debris.

Shot blasting may be conducted in any suitable shot blasting apparatus. For example, the apparatus may be a centrifugal blasting apparatus, such as the model (FB-4/28/E/MR) Flexbel system available from BCP Wheelabrator of 1219 Corporate Drive, Burlington, Ontario, L7L 5V5, Canada, which is suitable for blast cleaning small parts. Abrasives may include steel shot, alumina, silica and other abrasive materials, of any size. Preferably, one half inch or larger S330 steel shot, also available from BCP Wheelabrator, can be used.

At step 106, abrasives may impact fragments with sufficiently high energy such that singular fragments are separated into multiple shot blasted pieces. In some examples, fragments may be separated into shot blasted pieces that are of substantially the same mass. For example, a single fragment may be separated into two shot blasted pieces during the shot blasting process. These two pieces may each be approximately half the mass of the fragment that the shot blasted pieces were formed from. In other examples, a single fragment may be separated into two pieces, wherein one piece is substantially the same mass as the fragment that the shot blasted pieces were formed from, and the other piece is of a significantly smaller mass. In other examples, a single fragment may be separated into a plurality of pieces, of varying masses. In some embodiments, step 106 can produce shot blasted pieces much smaller than any fragment in the plurality of fragments produced in step 104.

At step 106, some fragments may be impacted with abrasives, yet remain intact. For example, a single fragment may be impacted with abrasives during the shot blasting process. Only a single shot blasted piece is produced during this operation. The resulting shot blasted piece produced may be substantially the same mass as the fragment that produced the shot blasted piece. Any discrepancy in mass may be attributed to the removal of any surface coatings, corrosion, contamination and debris, present on the surface of the fragment before the shot blasting operation, in addition to the absence of a relatively thin layer of base metal material that may have been removed during the shot blasting operation.

Additional steps may be performed after the shot blasting process 106 to remove abrasive particles and debris produced during the shot blasting process. These steps may include washing or rinsing with a pressurized fluid, such as air, water or mineral oil to clear abrasive particles and debris from shot blasted pieces, or sifting or vibrating the shot blasted parts on a screen, mesh or grate, or, when the shot is made of a suitable material such as steel, using a magnet to draw the shot out of the shot blasted pieces.

At step 108, an estimated mass is determined for the plurality of shot blasted pieces. In some examples, the mass of shot blasted pieces may be measured individually. The mass of each individual shot blasted piece may be summed together, resulting in a total mass of the plurality of shot blasted pieces. In other examples, a bulk batch of shot blasted pieces may be measured together, determining a total mass of the plurality of shot blasted pieces in a single operation. Any method known in the art to measure the mass of objects may be used, including but not limited to mechanical spring scales, mechanical balance scales, hydraulic scales, strain gauge based electronic scales or load cell based electronic scales.

At step 110, an aggregate composition estimate for the plurality of shot blasted pieces is determined. These measurements may be used to estimate the aggregate composition of the plurality of shot blasted pieces. Statistical methods may be used to determine the aggregate composition estimate from a plurality of composition measurement samples. Any statistical method known in the art to estimate attributes of a larger population from a smaller sample population may be used. Statistical methods may also be used to provide uncertainty values of aggregate composition estimates. In some embodiments of method 100, determining the aggregate composition estimate for the plurality of shot blasted pieces comprises determining a plurality of composition measurements of the material of the plurality of shot blasted pieces. For example, in some embodiments, the composition of at least 50% of the shot blasted pieces is measured, and the aggregate composition estimate is based on that plurality of composition measurements. In another embodiment, the composition of at least 80% of the shot blasted pieces is measured, and the aggregate composition estimate is based on that plurality of composition measurements. In yet another embodiment, the composition of at least 95% of the shot blasted pieces is measured, and the aggregate composition estimate is based on that plurality of composition measurements.

Any method known in the art to measure the composition of a material sample may be used. In some examples, a laser scanner can be used to measure the composition of the plurality of shot blasted pieces. This can involve using a laser to heat the material at a point on the surface of the shot blasted piece to a temperature at which that material will emit a characteristic radiation while cooling down. A sensor can then be operated to detect that characteristic radiation to provide a spectrum of signal magnitudes at different frequencies. This spectrum of signal magnitudes at different frequencies can then be analyzed by a computer processor to infer the relative concentrations of different elements within the alloy, as described, for example, in U.S. Pat. No. 10,220,418, incorporated herein by reference.

In one example of method 100, a "Laser-Induced Breakdown Spectroscopy" ("LIBS") composition analyzer manufactured by Laser Distance Spectrometry may be adapted as the laser scanner and sensor. The LIBS composition analyzer may include a radiation emitter, such as an Nd:YAG laser. The laser may shine at a frequency ranging from 1 to 20 hertz, thereby raising the temperature of the fragments at the point of contact between the shot blasted piece and the laser to above 30,000 degrees Celsius and generating plasma. The plasma may quickly cool down, returning the energized ions into a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each shot blasted piece at a surface of that shot blasted piece and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metal-oxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular aluminum alloy rim recycling operation. Such conditions may include vibrations resulting from the operation of aluminum alloy rim transfer mechanisms, and dust and other particles produced in the recycling process.

At step 112, a selected target alloy is selected. Specifications for a plurality of prospective target alloys may be considered in making that selection. Each of the prospective target alloys may have a different elemental composition. Small variations in elemental composition may result in large variations of material properties. Certain sets of material properties may be more desirable than others. More desirable properties may translate to a material with a higher economic value. Target alloys may be selected by material properties, economic value, market demand, urgent requests from customers such as foundry operators, or other attributes. In some embodiments, target alloys may be selected at least partially based on the aggregate composition estimate made at step 110.

At step 114, a discrepancy estimate is determined. For each element in the plurality of elements measured to provide the composition estimate at step 110, a discrepancy between the element concentration estimate for that element and the element range of the selected target alloy for that element is estimated. This discrepancy is deemed to be an estimate because the discrepancy is measured between the specific target elemental composition values of the target alloys and the aggregate composition estimate of the plurality of shot blasted pieces obtained as step 110. The composition values of the selected target alloy may be expressed as a range. For example, a specific alloy may have an acceptable range of silicon composition of 9.8-10.4% by weight. The discrepancy estimate may be based on the discrepancy between the nearest extreme of the selected target alloy composition range and the estimated aggregate composition value. Using the previous example, say the aggregate composition estimate includes 9.6% silicon by weight. Then the discrepancy estimate for silicon may be 0.2%, as measured by the discrepancy between estimated composition and nearest extreme of selected target alloy composition range. In other examples, the discrepancy estimate may be based on the discrepancy between the furthest extreme of the selected target alloy composition range and the estimated aggregate composition value. Using the previous selected target alloy example, the aggregate composition estimate may include 9.6% silicon by weight. Then the discrepancy estimate for silicon may be 0.8%, as measured by the discrepancy between estimated composition and furthest extreme of selected target alloy composition range. In other examples, the discrepancy estimate may be based on the discrepancy between the midpoint of the selected target alloy composition range and the estimated aggregate composition value. Using the previous selected target alloy example, the aggregate composition estimate may include 9.6% silicon by weight. The discrepancy estimate for silicon would then be 0.5%, as that is the discrepancy between estimated composition of 9.6% silicon by weight and the midpoint of the selected target alloy composition range of 10.1% silicon by weight. Using a midpoint discrepancy measurement may be advantageous in situations in which the aggregate composition estimate is uncertain, with relatively symmetric uncertainty (i.e. similar uncertainty in both the positive and negative direction). Using a furthest or nearest extreme discrepancy measurement may be advantageous in situations where the uncertainty of an aggregate composition estimate is asymmetrical, and imprecision is more likely in a certain direction.

At step 116, an alloying supplement is determined. This alloying supplement can be determined based on the estimated mass of the plurality of shot blasted pieces determined at step 108 and the discrepancy estimate determined at step 114. The amounts of each element in the alloying supplement can be determined such that when it is combined with the plurality of shot blasted pieces, the total aggregate composition of the combination of the plurality of shot blasted pieces and the alloying supplement is within the specification of the selected target alloy.

For example, say that the selected target alloy selected at step 112 is Eccomelt® 356.2. Eccomelt® 356.2 has the following elemental composition requirements: Si: 6.5%-7.5%, Cu: 0%-0.02%, Fe: 0%-0.14%, Mg: 0.25%-0.4%, Zn: 0%-0.018%, Mn: 0%-0.03%, Ni: 0%-0.008%, Cr: 0%-0.03%, Sn: 0%-0.01% Ti: 0%-0.15% Sr: 0%-0.02% Al: 91.674% minimum.

At step 110, the following aggregate composition estimate is determined for a set of shot blasted pieces: Si: 6.312%, Cu: 0.015%, Fe: 0.13%, Mg: 0.312%, Zn: 0.015%, Mn: 0.015%, Ni: 0.004%, Cr: 0.021%, Sn: 0.008%, Ti: 0.02%, Sr: 0.019%, Al: 91.721%, Other: 1.408%.

At step 114, a discrepancy estimate is determined. The Si concentration value does not fit within the Eccomelt® 356.2 specification. All other element concentration values are within the Eccomelt® specification. Measuring to the nearest extreme, the Si value is 0.188 percentage points too low.

At step 108, the total mass of the plurality of shot blasted pieces was estimated at 1000 lbs. Using this value, along with the aggregate composition estimates determined at step 110, one can estimate the mass of each constituent element in the composition. In the current example, one can multiply each estimated composition percentage by the estimated total mass of 1000 lbs. For example, 6.312% silicon*1000 lbs=63.12 lbs silicon in the batch. Repeating this calculation for each constituent element yields the following values: Si: 63.12 lbs, Cu: 0.15 lbs, Fe: 1.3 lbs, Mg: 3.12 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 917.21 lbs, Other: 14.08 lbs.

The alloying supplement is determined, in order to adjust the composition to comply with the specifications of the target alloy. In the following example, for process practicality, say that alloying supplements are to be dispensed in one pound increments. In other examples, other supplement increments may be specified. That is, in these other examples, minimum increments of one half pound, or other amounts, of alloying supplements may be added to the batch. The alloying supplement may be calculated using the following equation:

$$X = \frac{t*m - c}{1 - t}$$

Wherein X=the supplement mass, t=target composition ratio, m=total batch mass and c=current mass of supplementing element. Substituting the following values: t=0.065, m=1000 and c=63.12.

Inserting the values given above in this equation yields a minimum silicon supplement amount of 2.01 lbs. In the current example, as the minimum dispensing increment is one pound, a supplement of 2.00 lbs would be insufficient. A supplement of 3 lbs is required. In other examples, wherein a smaller minimum dispensing increment is required, a smaller supplement size may be supplied. For example, if the minimum dispensing increment is one half pound, the supplement may be 2.5 lbs. If the minimum dispensing increment is 0.1 lbs, the supplement may be 2.1 lbs. This may be economically advantageous, as the amount of silicon required for the supplement is smaller, reducing material cost.

For some elements, and some alloys, there may be no minimum, but only maximum percentage composition requirements. For example, Eccomelt® 356.2 specifies maximum percentages, but no minimum percentages, for copper, iron, zinc, manganese, nickel and tin. Unless at least one target alloy requires a non-zero minimum percentage of an element, there would be no need to add that element to the shot blasted pieces stock that element and thus need to stock it. For target alloys having non-zero minimum percentage requirements for certain elements, when supplementing these elements, at certain batch sizes, a minimum dispensing increment of one pound may be too large. That is, it may be impossible to dispense the amount required to provide an actual element composition within a specified element range. For example, magnesium composition specification for Eccomelt® 356.2 is 0.25%-0.4%. In a batch size of 500 lbs, say that magnesium composition is 0.22%, for a total mass of 1.1 lbs. This is not within specification. Magnesium must be supplemented. However, the smallest possible magnesium supplement of 1 lb would result in a total mass of magnesium of 2.1 lbs, in a total batch mass of 501 lbs. Dividing 2.1 by 501 results in a magnesium composition of 0.42%. This now exceeds the Eccomelt® specification. In this example, either a smaller supplement dispensing increment must be used, or further supplementation of other elements (e.g. more aluminum is supplemented afterwards to offset excessive magnesium) must be conducted in order to reach an acceptable composition (or the total batch mass must be increased).

Given a particular target alloy, for every element having a specified non-zero minimum percentage requirement for that alloy, we can determine a largest acceptable minimum dispensing increment that depends on the acceptable composition percentage range of the element for a certain target alloy and the total batch size. For example, the largest acceptable minimum dispensing increment must be small enough that the amount of that element included in the alloying supplement can be calibrated to provide an aggregate composition of an element above the minimum composition value and below the maximum composition value. The largest acceptable minimum dispensing increment may vary with the total mass of the batch, and the difference between the upper composition limit and lower composition limit for a given element. Recall that Eccomelt® 356.2 has the following elemental composition requirements: Si: 6.5%-7.5%, Cu: 0%-0.02%, Fe: 0%-0.14%, Mg: 0.25%-0.4%, Zn: 0%-0.018%, Mn: 0%-0.03%, Ni: 0%-0.008%, Cr: 0%-0.03%, Sn: 0%-0.01% Ti: 0%-0.15% Sr: 0%-0.02% Al: 91.674% minimum. For Eccomelt® 356.2, only silicon, magnesium and aluminum have specified non-zero composition minimums, and, therefore, largest acceptable minimum dispensing increments. There is no situation in which any of the other elements of interest for Eccomelt® 356.2 will need to be supplemented to correct batch composition.

This largest acceptable minimum dispensing increment may be calculated using the following equation:

$$X = \frac{r*m}{(1-r)}$$

In this equation, X=largest acceptable minimum increment [mass], and r=element proportion range (the upper limit of the proportion or ratio of the mass of that element to total mass minus the lower limit), and m=total initial mass size [mass]. For Eccomelt® 356.2, silicon has a lower composition limit of 6.500% and an upper composition limit of 7.500%. 7.500%−6.500%=1.000% or a ratio of 0.01. For a batch size of 1000 lbs, the following values may thus be substituted into the above equation: r=0.01, m=1000. A resulting largest acceptable minimum dispensing increment of 10.101 lbs, can then be calculated. Corresponding values may be calculated for every element that the alloy must include. For a batch mass of 1000 lbs of Eccomelt® 356.2, the elements each have the following largest acceptable minimum dispensing increment: Si: 10.101 lbs, Mg: 1.502 lbs, Al: 90.822 lbs.

Other target alloys may have different composition specifications. This will affect which elements have largest acceptable dispensing increments, and for which elements supplementing stores must be maintained. Aural2 has the following elemental composition requirements: Si: 9.800%-10.400%, Cu: 0%-0.030%, Fe: 0.160%-0.200%, Mg: 0.270%-0.350%, Zn: 0%-0.030%, Mn: 0.470%-0.550%, Ni: 0%-0.030%, Cr: 0%-0.030%, Sn: 0%-0.030% Ti: 0.050%-0.080% Sr: 0.015%-0.025% Al: 88.245%-89.235%. Aural2 has composition minimum values specified for the following elements: Silicon, iron, magnesium, manganese, titanium, strontium, and aluminum. Therefore, only stores of those elements are required to be held to supply alloying supplements. The elements not specified above, for which the minimum percentage composition requirement is zero, will not be required to be added to the batch in order to adjust composition.

This largest acceptable minimum dispensing increment may once again be calculated using the following equation:

$$X = \frac{r*m}{(1-r)}$$

In this equation, X=largest acceptable minimum increment [mass], r=element proportion range (the upper limit of the proportion or ratio of the mass of that element to total mass minus the lower limit), and m=total initial mass size [mass]. For Aural2, iron has a lower composition limit of 0.160% and an upper composition limit of 0.200%. 0.200%-0.160%=0.040% or a ratio of 0.0004. For a batch size of 1000 lbs, the following values may thus be substituted into the equation above equation: r=0.0004, m=1000. The resulting largest acceptable minimum dispensing increment is 0.400 lbs, as per the above equation. This value may be calculated for every element that the alloy must include. For a batch mass of 1000 lbs of Aural2, the elements each have the following largest acceptable minimum dispensing increment: Si: 6.036 lbs, Fe: 0.400 lbs, Mg: 0.801 lbs, Mn: 0.801 lbs, Ti: 0.300 lbs, Sr: 0.100 lbs, Al: 9.999 lbs.

Note that the largest acceptable minimum dispensing increment will vary if the total batch mass is varied. In some examples, the batch may be supplemented in several iterations, each iteration increasing the total batch mass. The largest acceptable minimum dispensing increment may increase with every iteration.

This equation may also be applied to cases in which the composition of a certain element is too high, and another element must be supplemented in order to lower the composition to an acceptable level. For example, in the case where the silicon composition is too high and the batch must be supplemented with aluminum to correct this, the above equation may be applied, wherein the range value for silicon is used, but the largest acceptable minimum dispensing increment corresponds to the element being added to offset the high silicon concentration, which in this case, is aluminum.

Consider again the above example where the total mass of the plurality of shot blasted pieces is estimated at 1000 lbs, made up as follows: Si: 63.12 lbs, Cu: 0.15 lbs, Fe: 1.3 lbs, Mg: 3.12 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 917.21 lbs, Other: 14.08 lbs. For this 1000 lbs of shot blasted pieces, an alloying supplement of 3 lbs of silicon is determined, to the nearest pound.

After adding 3 lbs of silicon, the total mass of the batch increases by 3 lbs, to a total of 1003 lbs. The resulting mass of each constituent element is: Si: 66.12 lbs, Cu: 0.15 lbs, Fe: 1.3 lbs, Mg: 3.12 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 917.21 lbs, Other: 14.08 lbs.

After adding the alloying supplement, the composition values must be recalculated. For example, the new mass of silicon is 66.12 lbs, in a total batch mass of 1003 lbs. Dividing 66.12 lbs by 1003 lbs results in a composition percentage for silicon of 6.592%.

This calculation may be repeated for each element present in the batch. The resulting recalculated composition values of the batch are: Si: 6.592%, Cu: 0.015%, Fe: 0.13%, Mg: 0.311%, Zn: 0.015%, Mn: 0.015%, Ni: 0.004%, Cr: 0.021%, Sn: 0.008%, Ti: 0.020%, Sr: 0.019%, Al: 91.447%, Other: 1.404%.

As seen above, the addition of an alloying supplement of a single element can skew the compositions of all other elements. Due to the small size of the alloying supplement compared to the total batch mass (3 lbs in a total batch of 1003 lbs) and the relatively small amounts of some elements, changes in composition percentages may be small. However, elements in the batch with relatively high masses, such as aluminum, may be skewed significantly in percentage by the addition of alloying supplement.

After the addition of the alloying supplement first used, the composition percentages may be re-compared to the target alloy specifications to ensure that the final batch is within the specifications of the target alloy.

In the example above, final aluminum composition is 91.447%. As per Eccomelt® 356.2 specification, aluminum composition must be above 91.674%. The resulting discrepancy is 0.227 percentage points. The composition must be corrected again to ensure that the composition is within the target alloy specification.

An additional alloying supplement must be determined. As the aluminum composition is too low, a supplement of aluminum must be added to the batch. It can be determined, using the previously defined equation, to the nearest pound, to be 24 lbs. The supplement must be rounded to the nearest pound, as the minimum dispensing increment is one pound. In other examples, a smaller minimum dispensing increment may be used.

After the addition of 24 lbs of aluminum, the total mass of the batch is now 1027 lbs. The total mass of aluminum is now 941.21 lbs. Using this value, one may once again calculate the composition of aluminum in the batch by dividing the mass of aluminum contained within the batch by the total batch mass. 941.21 lbs divided by 1027 lbs results in a final composition of aluminum of 91.674%. This is within the specification of Eccomelt® 356.2 (Min. Al composition of 91.674%).

As the addition of the alloying supplement may skew the composition of all other elements, the composition of all elements must be calculated again. Using the known masses of each element in the batch, and the new total mass (1027 bs), the composition of the batch may be calculated. Dividing the mass of each element by the total mass yields the composition percentage for each element. Performing this operation yields the following composition values for the following example: Si: 6.438%, Cu: 0.015%, Fe: 0.127%, Mg: 0.304%, Zn: 0.015%, Mn: 0.015%, Ni: 0.004%, Cr: 0.020%, Sn: 0.008%, Ti: 0.019%, Sr: 0.019%, Al: 91.647%, Other: 1.371%.

After the previous alloying supplement, silicon composition has been reduced below the minimum threshold defined by the Eccomelt® 356.2 specification. The silicon composition is now 6.438%, which is 0.062 percentage points below the minimum value as per the Eccomelt® 356.2 specification (6.500%).

An alloying supplement once again must be calculated for silicon in order to correct the batch composition to the target alloy composition specification. This can be done as per the previous silicon supplement determination operation. Once again, this may skew other elements, such as aluminum, which once again must be supplemented. After a certain finite number of iterations, the composition will converge to a composition that matches the target alloy composition specification.

For the following example, after this iterative process is performed, a total supplement of 8 lbs silicon, and 83 lbs aluminum results in a composition that meets the target alloy composition specification. The total batch mass is now 1091 lbs. The mass composition of each element is as follows: Si: 71.12 lbs, Cu: 0.15 lbs, Fe: 1.3 lbs, Mg: 3.12 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 1000.21 lbs, Other: 14.08 lbs. The composition value of each element may be determined by dividing the mass of each element in the batch by the total batch mass of 1091 lbs. Performing that calculation yields the following compositions: Si: 6.519%, Cu: 0.014%, Fe: 0.119%, Mg: 0.286%, Zn: 0.014%, Mn: 0.014%, Ni: 0.004%, Cr: 0.019%, Sn: 0.007%, Ti: 0.018%, Sr: 0.017%, Al: 91.678%, Other: 1.291%. These values conform to the Eccomelt® 356.2 specification as outlined above.

The example at hand was performing using a minimum dispensing mass of one pound. In other examples, where smaller dispensing masses are available, the alloying supplement may differ. It may be economically advantageous to use a smaller dispensing mass, as the amount of alloying supplements may be reduced, reducing process cost.

In some examples, certain elements may exceed the maximum value outlined in the target alloy specification. For example, at step 110, the following composition estimate may be determined: Si: 6.741%, Cu: 0.021%, Fe: 0.13%, Mg: 0.39%, Zn: 0.015%, Mn: 0.015%, Ni: 0.004%, Cr: 0.021%, Sn: 0.008%, Ti: 0.02%, Sr: 0.019%, Al: 91.721%, Other: 0.895%. The target alloy in this example is Eccomelt® 356.2. The total batch mass is an estimated 1000 lbs. In the current example, the copper composition value is too high. The discrepancy from the maximum allowable amount is 0.001 percentage points. It can be difficult and expensive to remove elements from an alloy. An easier and less expensive alternative is to increase the mass of at least some of the other elements in the batch to reduce the proportion of copper to be within an acceptable range.

In such cases, various processes may be employed to determine the optimal alloying supplement. For example, titanium composition is 0.13 percentage points below the maximum allowable amount. Additionally, aluminum composition is above the minimum aluminum composition value; however, aluminum has no maximum composition value as per the Eccomelt® 356.2 specification. Either element may be used (or any of the other elements that are below the target alloy composition maximum, such as tin) to supplement the bulk alloy in order to adjust the batch composition towards the specifications of the target alloy. Certain alloys may be more desirable for supplementing purposes. The economic value of the final product provided at step 118 is equivalent to the economic value of the target alloy. The final value may therefore be fixed. Other aspects of the method may be optimized for profit, such as reducing process cost. In order to maximize profit, alloying supplements may be chosen in order to minimize costs.

In the current example, titanium or aluminum may both be used to supplement the batch in order to tailor the batch composition, such that it aligns with the composition specifications of the target alloy. Per unit mass, aluminum is of a much lower cost than titanium. Therefore, it is preferable to adjust composition using an alloying supplement that is primarily aluminum. In other examples, other elements may be used to supplement.

The alloying supplement amount must be determined. In the current example, aluminum is dispensed in one pound increments. The alloying supplement may be calculated using the following equation:

$$X = \frac{c}{t} - m$$

Wherein X=the supplement mass, t=target composition proportion of excessive element, m=total batch mass and c=current mass of excessive element. Recall that the maximum copper composition for Eccomelt® is 0.02% while the percentage copper in the shot blasted pieces is 0.021%. Substituting the following values: t=0.0002, m=1000 lbs and c=0.210 lbs, we calculate that to the nearest pound, the aluminum supplement required to reduce copper concentration such that it meets the target alloy composition specification is 50 lbs. After the addition of the alloying supplement, the batch has a total mass of 1050 lbs.

After this aluminum is added, the mass composition of each element of interest in the batch is as follows: Si: 67.41 lbs, Cu: 0.21 lbs, Fe: 1.3 lbs, Mg: 3.9 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 967.21 lbs, Other: 8.950 lbs. The mass of each constituent element can then be divided by the total batch mass of 1050 lbs to determine the following composition percentages: Si: 6.420%, Cu: 0.020%, Fe: 0.124%, Mg: 0.371%, Zn: 0.014%, Mn: 0.014%, Ni: 0.004%, Cr: 0.020%, Sn: 0.008%, Ti: 0.019%, Sr: 0.018%, Al: 92.115%, Other: 0.852%.

As can be seen, adding 50 lbs of aluminum skews the composition of all other elements. Thus, these composition elements must again be compared to the target alloy composition specification to determine whether or not they conform to the specification. Comparing the above composition to the Eccomelt® 356.2 specification, it can be seen that the silicon composition value is 0.080 percentage points too low. A further alloying supplement must be added to determine what the correct alloying supplement is. This may once again be calculated with the following equation:

$$X = \frac{t*m - c}{1 - t}$$

In this equation, X=the supplement mass, t=target percentage, m=total batch mass and c=current mass of supplementing element. Substituting the following values: t=0.065, m=1050 lbs and c=67.410 lbs, the final value obtained is 0.898 lbs. Rounding this up to the nearest pound results in a supplement of 1 lb. The value is rounded up to the nearest pound to accord with the minimum supplement dispensing increment of one pound.

Adding the 1 lb silicon supplement to the batch results in a total batch mass of 1077 lbs. The mass of each element of interest is as follows: Si: 68.41 lbs, Cu: 0.21 lbs, Fe: 1.3 lbs, Mg: 3.9 lbs, Zn: 0.15 lbs, Mn: 0.15 lbs, Ni: 0.04 lbs, Cr: 0.21 lbs, Sn: 0.08 lbs, Ti: 0.2 lbs, Sr: 0.19 lbs, Al: 967.21 lbs, Other: 8.950 lbs. The mass of each constituent element may be divided by the total batch mass of 1051 lbs to determine the following composition percentages: Si: 6.509%, Cu: 0.020%, Fe: 0.124%, Mg: 0.371%, Zn: 0.014%, Mn: 0.014%, Ni: 0.004%, Cr: 0.020%, Sn: 0.008%, Ti: 0.019%, Sr: 0.018%, Al: 92.028%, Other: 0.852%.

Comparing the above composition to the Eccomelt® 356.2 specification confirms that the composition now conforms to the Eccomelt® 356.2 specification.

In the previous example, while the silicon value was originally within specification, adding another element in a quantity sufficient to correct the copper composition value skewed the composition such that the silicon composition value was no longer within specification. Therefore, a silicon supplement was required as well. In some examples, the alloying supplement may be optimized such that the cost of supplement elements is minimized, accounting for this skewing of elements. For example, aluminum may be added such that the threshold value of silicon is reached. E.g., aluminum is supplemented until silicon composition is 6.500%, the threshold allowable amount as per the target alloy specification. At that point, both silicon and aluminum in specific proportions may be added to the batch until the copper composition reaches a permissible level. Depending on the cost of each supplementing element and minimum dispensing quantities of each element, it may be economically advantageous to supplement the alloy in such a manner. For example, in the case where aluminum is available at a lower per unit mass cost than silicon, it may be desirable to supplement the batch composition in this manner, to minimize the amount of silicon required.

In another example, the selected target alloy selected at step 112 is Aural2. Aural2 has the following elemental composition requirements: Si: 9.800%-10.400%, Cu: 0%-0.030%, Fe: 0.160%-0.200%, Mg: 0.270%-0.350%, Zn: 0%-0.030%, Mn: 0.470%-0.550%, Ni: 0%-0.030%, Cr: 0%-0.030%, Sn: 0%-0.030% Ti: 0.050%-0.080% Sr: 0.015%-0.025% Al: 88.245%-89.235%.

At step 110, say that the following aggregate composition estimate is determined for a batch of shot blasted pieces: Si: 9.846%, Cu: 0.015%, Fe: 0.2%, Mg: 0.35%, Zn: 0.03%, Mn: 0.5%, Ni: 0.004%, Cr: 0.021%, Sn: 0.008%, Ti: 0.075%, Sr: 0.01%, Al: 88.941%, Other: 0%.

At step 114, a discrepancy estimate is determined. The Sr concentration value does not fit within the Aural2 specification. All other element concentration values are within the Aural2 specification. Measuring to the nearest extreme, the Sr value is 0.005 percentage points too low.

At step 108, the total mass of the plurality of shot blasted pieces was estimated at 1000 lbs. Using this value, along with the aggregate composition estimates determined at step 110, one can estimate the mass of each constituent element in the composition. In the current example, one can multiply each estimated composition percentage by the estimated total mass of 1000 lbs. For example, 0.010% strontium*1000 lbs=0.100 lbs strontium in the batch. Repeating this calculation for each constituent element yields the following values: Si: 98.46 lbs, Cu: 0.15 lbs, Fe: 2 lbs, Mg: 3.5 lbs, Zn: 0.3 lbs, Mn: 5 lbs, Ni: 0.04 lbs, Cr: 0.21 lbs, Sn: 0.08 lbs, Ti: 0.75 lbs, Sr: 0.1 lbs, Al: 889.41 lbs, Other: 0 lbs.

The alloying supplement is determined to adjust composition to comply with the specifications of the target alloy. In the following example, for process practicality, alloying supplements are to be dispensed in one pound increments. In other examples, other supplement increments may be specified. In other examples, minimum increments of one half pound, or other amounts, of alloying supplements may be added to the batch. The alloying supplement may be calculated using the following equation:

$$X = \frac{t*m - c}{1 - t}$$

Where X=the supplement mass, t=target percentage, m=total batch mass and c=current mass of supplementing element. Substituting the following values: t=0.00015, m=1000 and c=0.100. The computation of the equation using the substituting values results in a supplement mass of 0.05 lbs.

In previous examples, a minimum dispensing increment of one pound was used. This is not a viable increment for the following case. To illustrate, adding a one pound supplement results in a total Sr mass of 1.1 lbs in a batch mass of 1001 lbs. Expressed as a percentage, the composition would be 0.110%. This far exceeds the maximum allowable amount of strontium in the composition (0.025%).

In this example, a minimum dispensing mass of 0.01 lbs is selected. The alloying supplement in this case, using the value calculated above, is 0.05 lbs. Adding this supplement to the batch results in a total strontium mass of 0.15 lbs in a batch mass of 1000.05 lbs. The total mass of each element of interest in the batch is as follows: Si: 98.46 lbs, Cu: 0.15 lbs, Fe: 2 lbs, Mg: 3.5 lbs, Zn: 0.3 lbs, Mn: 5 lbs, Ni: 0.04 lbs, Cr: 0.21 lbs, Sn: 0.08 lbs, Ti: 0.75 lbs, Sr: 0.15 lbs, Al: 889.41 lbs, Other: 0 lbs.

As the addition of alloying supplements can skew the composition of all other elements, the composition percentages must be re-estimated using the new total batch mass. However, as the supplementing mass is relatively small in comparison to the masses of elements present in the batch, the proportion of most elements changes only slightly. Percentage composition may be calculated by dividing the mass of each element present in the batch by the total batch mass of 1000.05 lbs. This calculation yields the following values: Si: 9.846%, Cu: 0.015%, Fe: 0.2%, Mg: 0.35%, Zn: 0.03%, Mn: 0.5%, Ni: 0.004%, Cr: 0.021%, Sn: 0.008%, Ti: 0.075%, Sr: 0.015%, Al: 88.937%, Other: 0%.

All of these values are within the Aural2 specification. No further composition adjustment is required.

At step 118, the plurality of shot blasted pieces and the alloying supplement are provided for manufacturing a metal alloy component. In some embodiments, an indication of the adjusted composition estimate or the selected target alloy may be provided with the alloying supplement and the plurality of the shot blasted pieces. When the plurality of shot blasted pieces and the alloying supplement are melted down into a homogenous aggregate for the purpose of manufacturing a new component through a known process (such as casting), the homogenous aggregate may have the composition of the adjusted composition estimate. The alloying supplement can be selected such that the composition of the bulk aggregate formed by combining the alloying supplement and the plurality of shot blasted pieces is similar in composition to a selected target alloy. Instead of a specific composition estimate of the combination of the plurality of shot blasted pieces and the alloying supplement, an indication of the selected target alloy could then be provided. The homogenous aggregate composition of the plurality of shot blasted pieces and the alloying supplement would then be within the specification of the selected target alloy elemental composition.

By providing an alloying supplement along with the plurality of shot blasted pieces for the manufacturing of a metal component, when these components are provided for the manufacturing of a metal alloy component, the composition of the alloy that the component is eventually produced from can be specifically tailored. This is advantageous, as the material properties of an alloy may vary greatly with slight variations of elemental composition. The tailoring of the aggregate composition through the addition of the alloying supplement may modify the material properties such that the aggregate composition alloy is more desirable for a certain use. For example, the alloying supplement may correct the composition of the homogenous aggregate, such that it aligns with the composition specification of Eccomelt® 356.2 aluminum alloy. This alloy may possess material properties favorable for certain uses. For example, the yield strength may be increased over the yield strength of the aggregate composition of the shot blasted pieces alone. This may increase the economic value of the end product. In other examples, customers may demand certain alloys or elemental compositions for a specific product use. Due to this specific demand, if one can provide a feed product for producing products of a specific alloy, one may be able to extract greater economic value from the recycling process. Without providing an alloying supplement, this may not be possible without further processing.

Figure 2:
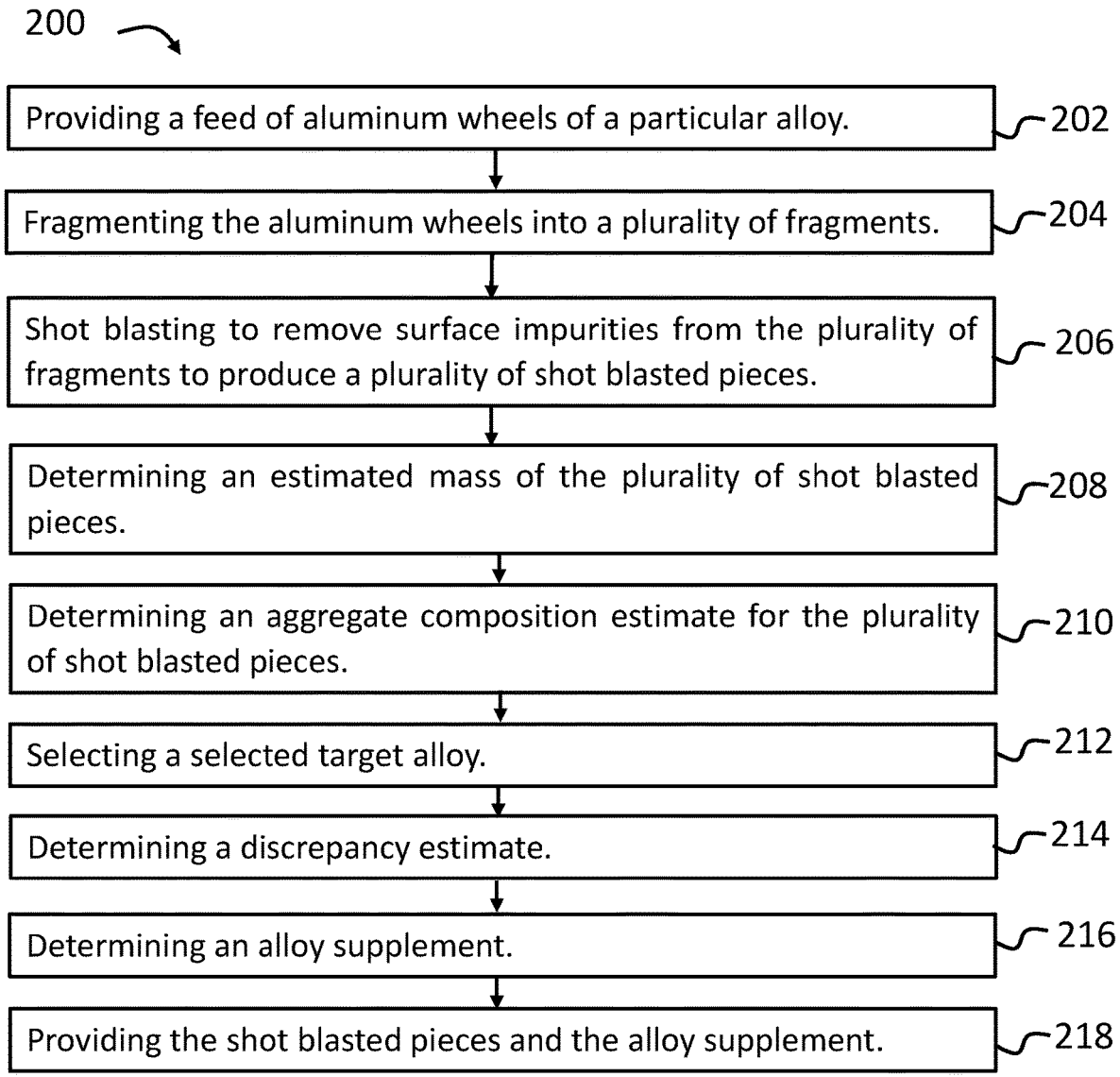
FIG. 2, in a flow chart, illustrates a method of recycling aluminum alloy wheels.

Referring now to FIG. 2, shown therein is method 200 of recycling aluminum alloy wheels. Method 200 of recycling aluminum alloy wheels is an example of an application of method 100 of recycling metal pieces. Accordingly, any of the examples discussed below may be applied to method 100 and any examples discussed above in reference to method 100 can be applied to method 200. Moreover, the discussion below is not meant to limit the methods described herein to that of recycling aluminum alloy wheels. For example, the methods described herein may be applied to a method for recycling objects made of steel alloys, copper alloys, or any other suitable metal. At step 202 of method 200, a feed of aluminum wheels of a particular alloy is provided. At step 204, the wheels are fragmenting into a plurality of fragments. At step 206, the fragments are subjected to shot blasting to remove surface impurities and produce a plurality of shot blasted pieces. At step 210, an aggregate composition estimate is determined for the plurality of shot blasted pieces. At step 212, a selected target alloy is selected. At step 214, a discrepancy estimate is determined. At step 216, an alloying supplement is determined. At step 218, the shot blasted pieces and the alloying supplement are provided for the manufacturing of an aluminum alloy component.

Figure 3:
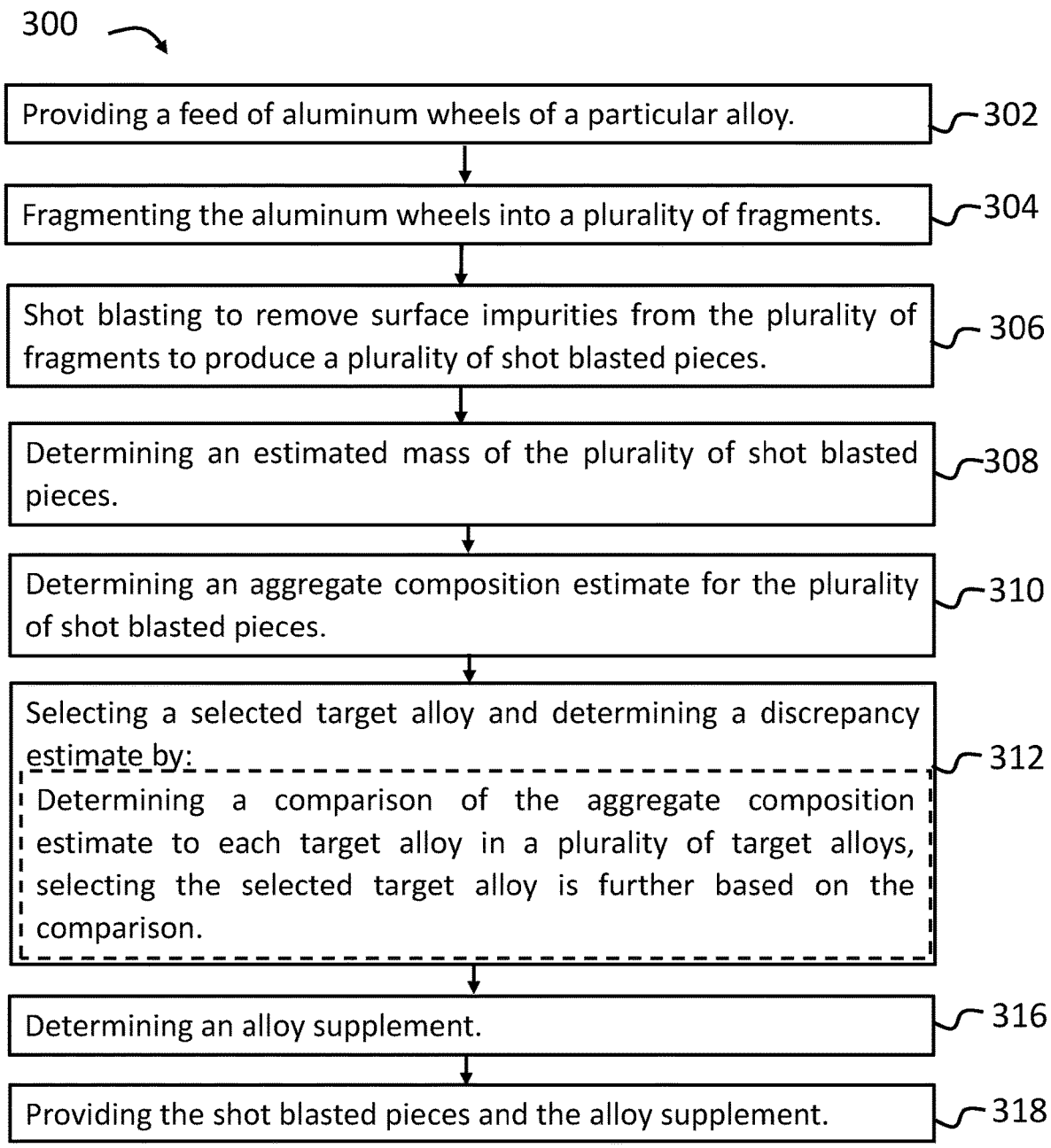
FIG. 3, in a flow chart, illustrates the method of recycling aluminum alloy wheels of FIG. 2 with additional, optional, steps.

Referring now to FIG. 3, shown therein is a method 300 of recycling aluminum alloy wheels. Method 300 of recycling aluminum alloy wheels is an example of an application of method 100 of recycling metal pieces. Accordingly, any of the examples discussed below may be applied to method 100 and any examples discussed above in reference to method 100 can be applied to method 300. Moreover, the discussion below is not meant to limit the methods described herein to that of recycling aluminum alloy wheels. For example, the methods described herein may be applied to a method for recycling objects made of steel alloys, copper alloys, or any other suitable metal. At step 302 of method 300, a feed of aluminum wheels of a particular alloy is provided. At step 304, the wheels are fragmenting into a plurality of fragments. At step 306, the fragments are subjected to shot blasting to remove surface impurities and produce a plurality of shot blasted pieces. At step 310, an aggregate composition estimate is determined for the plurality of shot blasted pieces. At step 314, a discrepancy estimate is determined and a selected target alloy is selected. In some examples, the selection of the target alloy is based on a comparison of the composition estimate, and the composition ranges of the target alloy. In some examples, this may include selecting the target alloy which has a set of composition ranges that the composition estimate is most closely aligned with, or requires the least amount of adjusting. In other examples, this may take the form of an economic optimization. Alloying supplements cost a certain amount per unit mass. Target alloys have a certain value per unit mass. The target alloy may be chosen to optimize the target alloy value, while minimizing supplement alloy cost.

At step 316, an alloying supplement is determined. At step 318, the shot blasted pieces and the alloying supplement are provided for the manufacturing of an aluminum alloy component.

In some examples of method 300, an alloying supplement supply is maintained such that aluminum is available for inclusion in the alloying supplement.

In some examples of method 300, a source of the alloying supplements is maintained. In some examples, the alloying supplements may include the following elements: silicon, iron, magnesium, manganese, titanium, strontium, zinc, copper, chromium, nickel and tin.

In some examples, supplements are maintained in quantities such that elements may be dispensed with a precision plus or minus one percent of the mass dispensed. In some examples, the supplements may be provided as one or more ingots, composed of at least two elements in the plurality of elements in the list of supplements that are melted and mixed together.

Figure 4:
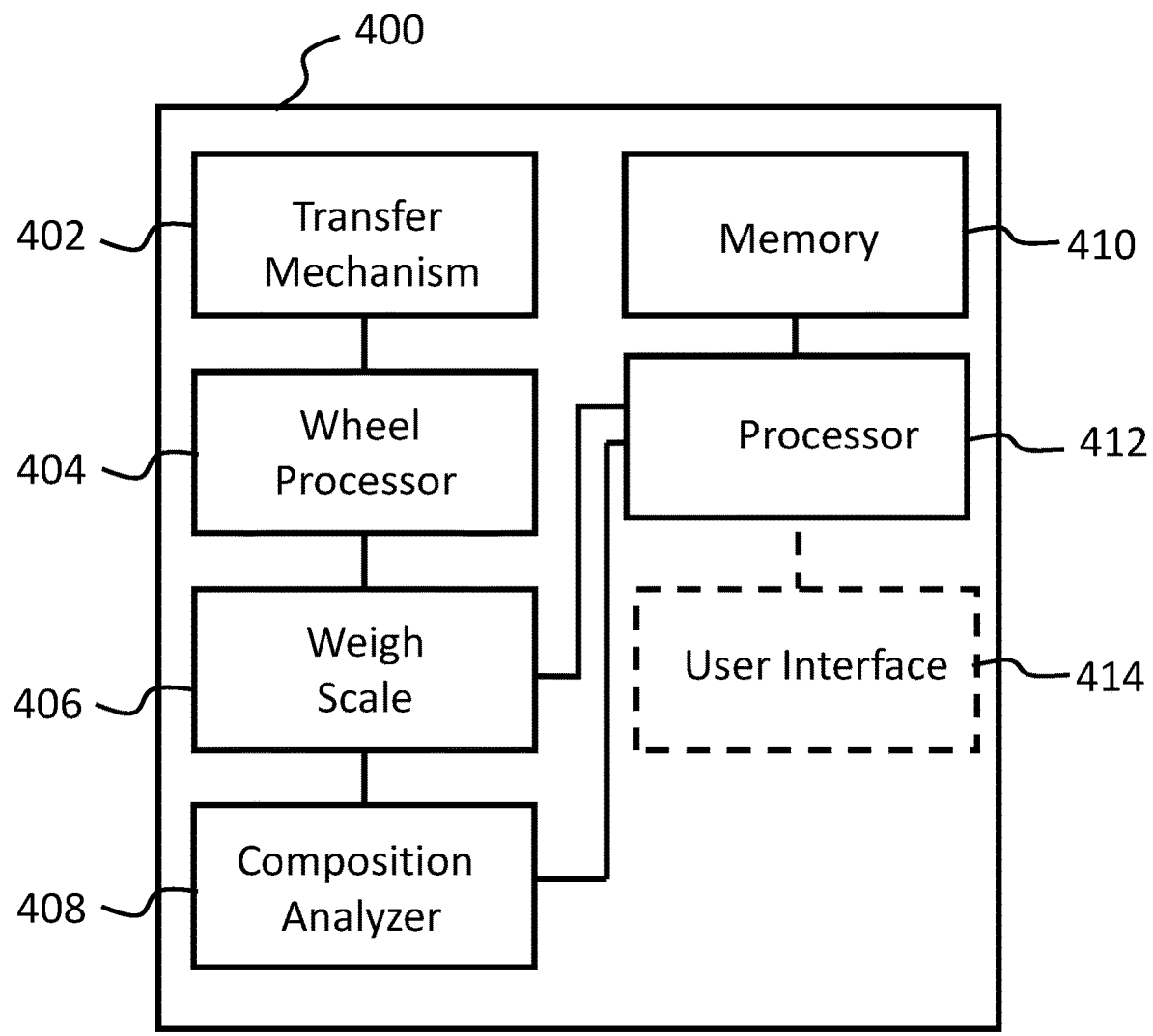
FIG. 4, is a block diagram showing a system for recycling aluminum alloy wheels.

Referring now to FIG. 4, shown therein is a block diagram of a system for providing an aluminum alloy product. As shown, the system 400 for providing an aluminum alloy product may include an aluminum alloy wheel transfer mechanism 402, an aluminum alloy wheel processor 404, a weigh scale 406, a composition analyzer 408, memory 410 and processor 412. In some examples, there may also be a user interface 414.

The transfer mechanism 402 may provide a feed of waste metal pieces, such as, for example without limitation, aluminum alloy wheels, of a particular alloy. The waste metal pieces may be loaded onto the transfer mechanism 402 by any suitable means (for example without limitation, by a truck dumping waste metal pieces into a hopper connected to one end of the transfer mechanism 402 or manually by workers placing waste metal pieces on the conveyor).

In some examples of the system 400, the wheel processor 404 can receive the feed of waste metal pieces from the transfer mechanism 402. The wheel processor 404 can fragment the waste metal pieces into a plurality of fragments. In some examples, the fragmenting unit of the wheel processor 404 may be a shredder or a cutter and a plurality of blades may be used to cut the waste metal pieces into a plurality of fragments. In other examples, the fragmenting unit may be a waterjet cutter.

Also contained within wheel processor 404 is a blast chamber. The blast chamber can receive the feed of fragments from fragmenting unit. Within the blast chamber, abrasives such as shot may be projected against the fragments to clean their surfaces (shot blasting). The impact of the shot with these surfaces can remove coatings, corrosion, environmental contamination and debris from the surfaces. In some examples of the system 400, the blast chamber may be a centrifugal blasting apparatus. One half inch or larger S330 steel shot can be used.

The centrifugal blasting apparatus in wheel processor 404 may include a housing that completely encloses a conveying means formed of a plurality of flights extending crosswise between endless chains for travel along a predetermined path. This housing can be sectioned into four compartments including one entrance chamber, two blast chambers, and one shakeout chamber. The flights in the blast chambers can be made of blast-resistant manganese rods, while the flights in the shakeout and entrance chambers can be made of less expensive lighter duty material. The debris removed from the waste metal pieces can be removed from the system in the shakeout chamber, and the spent abrasive can be recircled back to the blast wheel.

During the shot blasting process in wheel processor 404, abrasives may impact fragments with sufficient energy to separate fragments into multiple, shot blasted pieces that are of smaller mass than the fragment from which they stem. The shot blasted pieces may be of varying sizes.

In some examples of system 400, the weigh scale 406 can receive a feed of cleaned aluminum fragments. The weigh scale 406 may use any method known in the art to determine the mass of the cleaned aluminum fragments received. Any method known in the art may be used to determine the mass of the cleaned aluminum pieces using weigh scale 406, including but not limited to mechanical spring scales, mechanical balance scales, hydraulic scales, strain gauge based electronic scales or load cell based electronic scales.

In some examples of system 400, composition analyzer 408 of the system 400 may be used to sense the plurality of cleaned aluminum fragments produced by the wheel processor 404 to determine a plurality of composition measurements of the material of the cleaned aluminum fragments. Composition analyzer 408 may use any method known in the art to measure the composition of material samples.

System 400 contains non-transient electronically readable memory 410. On the memory 410, information regarding a plurality of target alloys may be stored. Along with this information for each target alloy, composition ranges for each alloy may also be stored on the memory 410.

Processor 412 is in electronic communication with the memory 410, composition analyzer 408 and weigh scale 406. Processor can receive composition measurements from a plurality of samples from composition analyzer 408. Using these composition samples, an aggregate composition estimate can be calculated. In some examples, statistical methods may be employed to determine an aggregate composition estimate from a plurality of samples. In some embodiments of the system 400, determining the aggregate composition estimate for the plurality of shot blasted pieces includes determining a plurality of composition measurements of the material of the plurality of shot blasted pieces.

Processor 412, in communication with memory 410, can compare the aggregate composition estimate with the composition ranges associated with the target alloys stored on memory 410. Using these comparisons, processor 412 can calculate a composition discrepancy estimate.

Based at least partly on the aggregate composition estimate, processor 412 selects a selected target alloy. In some examples, the target alloy selected may be chosen because its composition range is most closely aligned with the aggregate composition estimate, or some other similar attribute.

In some examples, the discrepancy between the aggregate composition and the target alloy composition range for at least one element may be non-zero.

Processor 412 can compute an alloying supplement based on the estimated mass determined by weigh scale 406, the discrepancy calculated previously, and the target alloy composition ranges stored on memory 410, of the selected target alloy.

In some examples of system 400, memory 410 stores value information for a plurality of target alloys, including a value per unit mass of each target alloy, and cost information, including element cost per unit mass of some elements in interest of the target alloys. Processor 412 can then select the target alloy based at least partly on the discrepancy estimate, value information and cost information stored in memory 410. For example, based on known target alloy unit values, alloying element costs, and aggregate composition discrepancy, processor 412 may select a target alloy in order to maximize the profit produced by the process conducted by system 400. This may include an optimization process, in which the cost is minimized, while the target alloy selected maximizes value. From a plurality of prospective target alloys, an optimal choice can be selected.

In some examples of system 400, the system may further comprise a user interface 414. The user interface can communicate the selected target alloy, and supplement alloy masses calculated by processor 412 to the user or operator of system 400.

Figure 5:
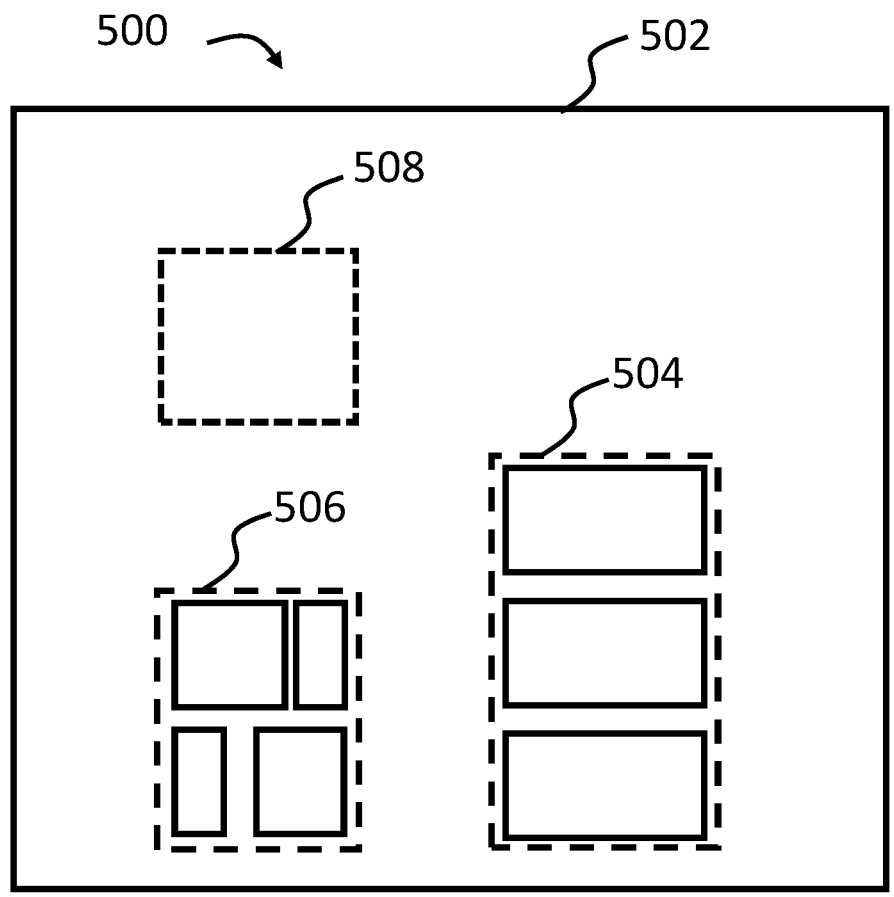
FIG. 5, is a block diagram illustrating a product produced by an aluminum wheel recycling method.

Referring now to FIG. 5, shown therein is a product 500. The product 500 comprises container 502. In some embodiments, the container 502 may be sealed. Within the container 502, the product may comprise a plurality of shot blasted pieces of aluminum alloy wheels 504, and an alloying supplement 506. The alloying supplement 506 can exclude any pieces of the aluminum alloy wheels 504.

Some embodiments of the product 500 may include an indication 508 on the container 502 of the composition estimate of the combination of the alloying supplement 506 and the plurality of shot blasted pieces of aluminum alloy wheels 504. In some examples, the indication 508 may take the form of the total elemental composition percentages by weight of each element of significant quantity present in the combination of the alloying supplement 506 and the plurality of shot blasted pieces of aluminum alloy wheels 504. In some examples, a significant quantity may be defined to include any element that is present in quantities of more than 0.01% of the total mass of the combination of the alloying supplement 506 and the plurality of shot blasted pieces of aluminum alloy wheels 504. In some examples, these composition values may be accompanied by uncertainty values. In some examples, indication 508 may take the form of a named selected target alloy. For example, indication 708 may specify that the combination of the alloying supplement 506 and the plurality of shot blasted pieces of aluminum alloy wheels 504 has a composition such that the elemental ranges are within the specifications of aluminum alloy Eccomelt® 356.2.

In some examples, indication 508 may additionally include the total mass of the combination of the alloying supplement 506 and the plurality of shot blasted pieces of aluminum alloy wheels 504. In some examples, indication 508 may additionally include the mass of the alloying supplement 506 and the mass of the plurality of shot blasted pieces of aluminum alloy wheels 504. The alloying supplement may be comprised of multiple distinct alloying elements. For example, the supplement may include iron, and manganese. The mass of the alloying supplement may be further broken down into sub-components, allowing one to determine the mass of each category of supplement.

In some examples of product 500, the mass of the alloying supplement 506 is less than 5% of the mass of the shot blasted pieces of aluminum wheels 504. In some examples of product 500, the mass of the alloying supplement 506 is less than 1% of the mass of the shot blasted pieces of aluminum wheels 504.

In some examples of product 500, at least 50% of the mass of the alloying supplement 506 is composed of silicon, iron, magnesium, manganese, titanium and/or strontium. In some examples of product 500, at least 80% of the mass of the alloying supplement 506 is composed of silicon, iron, magnesium, manganese, titanium and/or strontium.

In some examples of product 500, the alloying supplement 506 may be provided in the form of one or more ingots. The ingot or ingots may comprise at least two elements in the plurality of elements of the supplement 506 that are mixed and melted together. In some examples of product 500, the alloying supplement 506 may be a single alloying ingot wherein each element of the plurality of elements are mixed and melted together.

Figure 6:
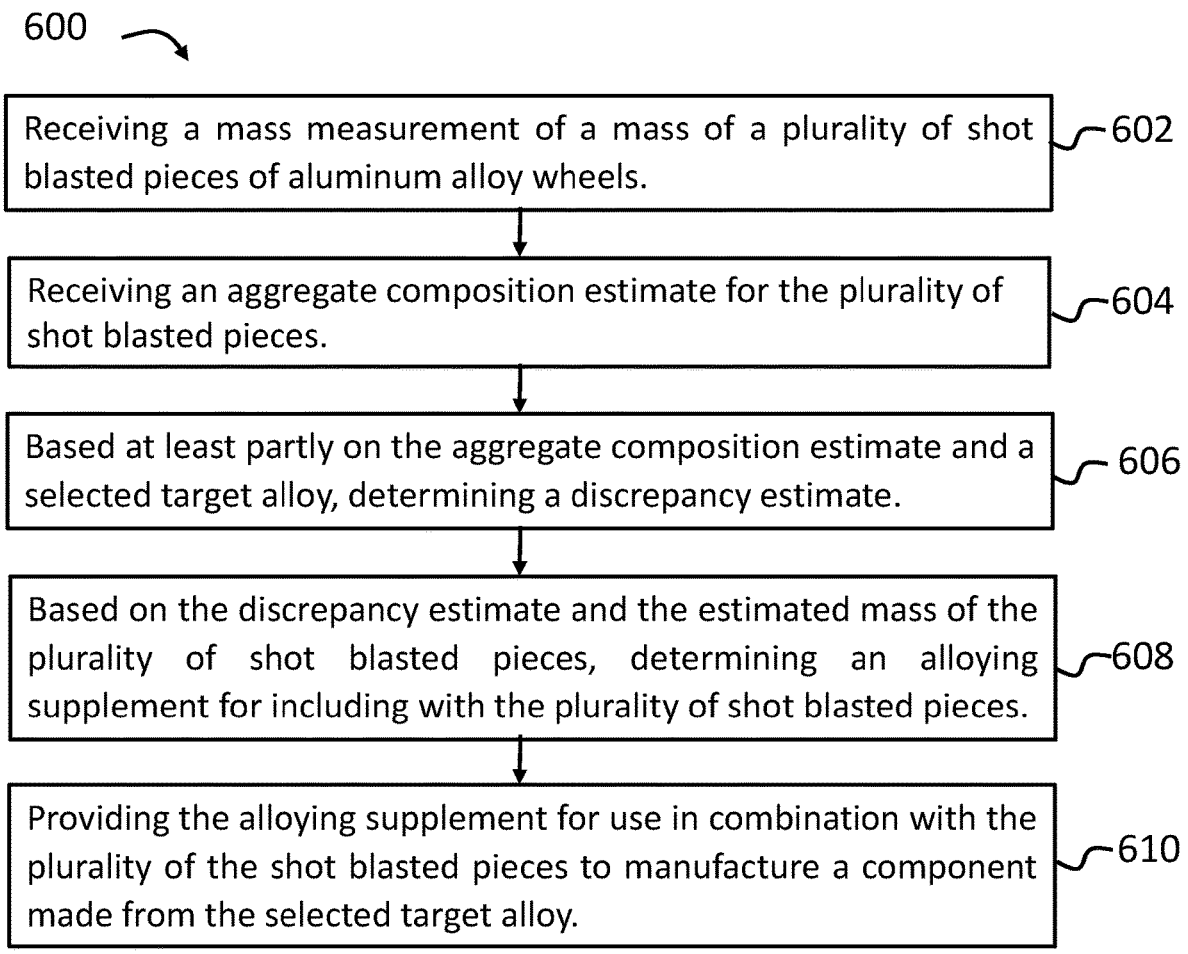
FIG. 6, in a flow chart, illustrates a method of providing an alloying supplement.

Referring now to FIG. 6, shown therein is a method of providing an alloying supplement 600. Method 600 starts with receiving a mass measurement at step 602. The mass measurement received at step 602 may be a measurement of a mass of a plurality of shot blasted pieces of aluminum alloy wheels. The next step in method 600, step 604, comprises receiving an aggregate composition estimate for the plurality of shot blasted pieces. The aggregate composition estimate received at step 604 includes a plurality of element concentration estimates comprising an element concentration estimate for each element in a plurality of elements. In some embodiments of the invention, the shot blasted pieces of aluminum alloy wheels may be provided at a recycling station by a first party. This first party may be, for example, an aluminum alloy wheel recycling company. This first party may also determine the aggregate composition estimate. The aluminum alloy wheel recycling company may then send both the measurement of the mass of the plurality of shot blasted pieces of aluminum alloy wheels, and the aggregate composition estimate to a second party, such as a company in the business of providing alloying supplements. This second party could then receive both the measurement of the mass of the plurality of shot blasted pieces of aluminum alloy wheels, and the aggregate composition estimate in steps 602 and 604 respectively, as described above.

Still referring to FIG. 6, following step 604, a discrepancy estimate may be determined at step 606. The discrepancy estimate may be based at least partly on the aggregate composition estimate received at step 604 and a selected target alloy. The selected target alloy may include a plurality of element ranges comprising an element range for each element in the plurality of elements. Determining the discrepancy estimate also includes determining, for each element in the plurality of elements, a discrepancy between the element concentration estimate for that element and the element range of the selected target alloy for that element. In some embodiments, the discrepancy between the element concentration estimate for at least one element and the element range of the selected target alloy for that element is non-zero.

At step 608 of method 600, based on the discrepancy estimate determined at step 606 and the estimated mass of the plurality of shot blasted pieces received at step 602, an alloying supplement may be determined. The alloying supplement can have a supplement mass and composition. The alloying supplement may be mixed with the plurality of shot blasted pieces to change the aggregate composition estimate to an adjusted composition estimate. For each element in the plurality of elements, the element concentration estimate of the adjusted composition estimate for that element can be adjusted to be within the element range of the target alloy for that element by mixing the alloying supplement in with the plurality of shot blasted pieces.

At step 610 of method 600, the alloying supplement may be provided for use in combination with the plurality of the shot blasted pieces to manufacture a component made from the selected target alloy. In some embodiments, the alloying supplement can be provided to a third-party foundry. In this embodiment, the method 600 further comprises providing, with the alloying supplement, an indication for associating the alloying supplement with the plurality of shot blasted pieces to be received at the third-party foundry from a source different from a source of the alloying supplement. For example, the shot blasted pieces may be received by the third party from the first party described above (e.g. the aluminum alloy wheel recycling company), while the alloying supplement may be received by the third party from the second party described above (e.g. a company in the business of providing alloying supplements). In some cases, the third party may receive multiple batches of shot blasted pieces from the first party, and each batch may have its own composition and selected target alloy. Accordingly, the second party providing an indication for associating the alloying supplement with a particular plurality of shot blasted pieces, i.e., a particular batch, helps the third party to assign and mix the alloying supplement with the appropriate batch to obtain the target alloy.

In some embodiments of method 600, a target alloy may be selected. The target alloy may be selected based at least partly on the aggregate composition estimate. The selected target alloy can be defined as having a composition such that for each element in a plurality of elements, the concentration of that element within the composition falls within an element range for that element in the plurality of elements. In this way, the selected target alloy can be defined in terms of a plurality of element ranges comprising for each element in the plurality of elements, the element range for that element.

In some embodiments of method 600, the selected alloy can be selected from a plurality of target alloys. Each target alloy can be defined in terms of that target alloy's specific plurality of element ranges. Selecting the selected alloy and determining the discrepancy estimate can comprise determining a comparison of the aggregate composition estimate to each target alloy in the plurality of target alloys including determining the discrepancy estimate for the selected target alloy. Each target alloy in the plurality of target alloys has a plurality of element ranges comprising an element range for each element in the plurality of elements. In this embodiment of method 600, at step 610, selecting the selected target alloy can be further based on this comparison. For example, and as described above, the selected target alloy can be selected based on the value per unit mass of that target alloy, as well as the cost of the alloying elements required to adjust the aggregate composition to be within an acceptable ranges for that selected target alloy.

In some embodiments of method 600, at step 610, providing the alloying supplement comprises melting and mixing quantities of at least two elements in the plurality of elements to provide at least one alloying ingot.

In some embodiments of method 600, the alloying supplement comprises at least two of silicon, iron, magnesium, manganese, titanium, strontium, zinc, copper, chromium, nickel and tin.

The present invention has been described here by way of example only. Various modification and variations may be made to these exemplary embodiments without departing from the spirit and scope of the invention, which is limited only by the appended claims.

I claim:

1. A method of providing an input to an aluminum alloy, the method comprising:
    providing a plurality of shot blasted pieces of aluminum alloy wheels within an interior of a sealable container;
    providing an alloying supplement within the interior of the sealable container, the alloying supplement excluding any pieces of aluminum alloy wheels; and,
    sealing the sealable container containing the plurality of shot blasted pieces of aluminum alloy wheels and the alloying supplement to impede contamination of the interior of the container from outside the container; and then
    shipping the sealable container containing the plurality of shot blasted pieces of aluminum alloy wheels and the alloying supplement.

2. The method as defined in claim 1, wherein a mass of the alloying supplement is less than 5% of a mass of the plurality of shot blasted pieces of aluminum wheels.

3. The method as defined in claim 2, wherein at least 50% of the mass of the alloying supplement is composed of silicon, iron, magnesium, manganese, titanium and/or strontium.

4. The method as defined in claim 3, wherein at least 80% of the mass of the alloying supplement is composed of silicon, iron, magnesium, manganese, titanium and/or strontium.

5. The method as defined in claim 1, wherein a mass of the alloying supplement is less than 1% of a mass of the plurality of shot blasted pieces of aluminum wheels.

6. The method as defined in claim 1, further comprising providing an indication on the sealed container of a composition estimate of the combined shot blasted pieces and alloying supplement.

7. The method as defined in claim 1 further comprising, before providing the plurality of shot blasted pieces of aluminum alloy wheels within the interior of the sealable container,
    determining an aggregate composition estimate for the plurality of shot blasted pieces by determining a plurality of composition measurements of the material of the plurality of shot blasted pieces, the aggregate composition estimate comprising a plurality of element concentration estimates comprising an element concentration estimate for each element in a plurality of elements;
    based at least partly on the aggregate composition estimate, selecting a selected target alloy, the selected target alloy having a plurality of element ranges comprising an element range for each element in the plurality of elements; and
    based at least partly on the aggregate composition estimate and the plurality of element ranges of the selected target alloy, determining the composition of the alloying supplement.

8. The method as defined in claim 7, wherein the alloying supplement comprises an alloying ingot, the alloying ingot comprising at least two elements in the plurality of elements, the at least two elements being mixed and melted together in the alloying ingot.

* * * * *